United States Patent [19]

Billarant

[11] Patent Number: 5,795,640
[45] Date of Patent: Aug. 18, 1998

[54] METHOD OF FABRICATING A FASTENER ASSEMBLY FOR BEING MOLDED INTO A FOAMED CUSHION

[75] Inventor: Patrick J. Billarant, Charlotte, N.C.

[73] Assignee: Aplix, Inc., Charlotte, N.C.

[21] Appl. No.: 783,939

[22] Filed: Jan. 17, 1997

Related U.S. Application Data

[60] Division of Ser. No. 633,627, Apr. 17, 1996, Pat. No. 5,665,449, which is a continuation-in-part of Ser. No. 566,870, Dec. 4, 1995, Pat. No. 5,654,070, which is a continuation of Ser. No. 381,507, Jan. 31, 1995, Pat. No. 5,500,268.

[51] Int. Cl.[6] ............................................. A44B 18/00
[52] U.S. Cl. ...................... 428/100; 428/99; 428/120; 428/900; 24/452; 24/442
[58] Field of Search ..................... 428/99, 100, 120, 428/900; 24/442, 452

[56] References Cited

U.S. PATENT DOCUMENTS

| | | | |
|---|---|---|---|
| 4,693,921 | 9/1987 | Billarant et al. | 428/100 |
| 4,784,890 | 11/1988 | Black | 428/100 |
| 4,802,939 | 2/1989 | Billarant et al. | 156/155 |
| 4,933,035 | 6/1990 | Billarant et al. | 156/155 |
| 5,606,781 | 3/1997 | Provost et al. | 24/452 |

FOREIGN PATENT DOCUMENTS

| | | | |
|---|---|---|---|
| 168241 | 1/1986 | European Pat. Off. | |
| 0 621 118 A1 | 10/1994 | European Pat. Off. | B29C 33/16 |
| 2 624 565 A1 | 6/1989 | France | F16B 5/07 |
| 9013133 | 1/1992 | Germany | |
| 1113214 | 5/1989 | Japan | B29C 39/10 |
| 225587 | 6/1989 | Japan | |

Primary Examiner—Alexander Thomas
Attorney, Agent, or Firm—Adams Law Firm, P.A.

[57] ABSTRACT

A fastener assembly of the type for being molded into cushions, and including a base having first and second major surfaces defining first and second opposed ends and first and second opposed side edges. A multiplicity of attachment members are carried by the base and extend outwardly from the base for cooperating with complementary attachment members. First and second laterally ending sealing gaps are respectively positioned adjacent the ends of the base. The sealing gaps are defined by areas of the first major surface of the base being devoid of the attachment members for permitting a sealing dam carried by a mold in which the foamed article is molded to fit into the sealing gaps and sealingly engage the first major surface of the base to form a foam-tight seal between the opposed ends of the base and the sealing dam of the mold to prevent intrusion of liquid foam past the ends of the base onto the attachment members of the base during molding of the article. A multiplicity of permanent anchors is carried by the base and extend outwardly from the second major surface of the base. First and second magnetically-attractable side edge sealing members may be attached to the base adjacent respective ones of the first and second opposing side edges of the base for being attracted to magnets positioned in the mold in which the foamed article is molded to form a foam-tight seal between the side edges of the base and the mold to prevent intrusion of liquid foam past the side edges of the base onto the attachment members of the base during molding of the article.

5 Claims, 5 Drawing Sheets

METHOD OF FABRICATING A FASTENER ASSEMBLY FOR BEING MOLDED INTO A FOAMED CUSHION

This application is a division of application Ser. No. 08/633,627 filed on Apr. 17, 1996 now U.S. Pat. No. 5,665,449, which is a continuation-in-part of U.S. patent application Ser. No. 08/566,870, filed Dec. 4, 1995, which is a continuation of U.S. patent application Ser. No. 08/381,507 filed Jan. 31, 1995, now U.S. Pat. No. 5,500,268.

TECHNICAL FIELD AND BACKGROUND OF THE INVENTION

This invention relates to a fastener assembly of the type which is molded into foam articles, such as seat cushions. The application also discloses a method of manufacturing the fastener assembly. The fastener assembly according to the particular embodiment disclosed in this application cooperates with a complementary fastener assembly on a upholstery cover to hold the cover in place on the cushion Hook and loop-type fasteners are a common type of fastener assembly used for this application.

Prior art patents in this field include Applicants U.S. Patent Nos. 4,693,921, 4,802,939, and 4,933,035. These patents disclose die provision of a thin plastic film which covers the attachment hooks to prevent intrusion of liquid foam into the area of the hooks during molding. Thus, the hooks do not become contaminated during molding and maintain their full ability to cooperate with the loops on the cover to keep the cover in place on the cushion. The film provides excellent protection against foam intrusion but must be removed from over the hooks after molding is complete according to one of several methods. Applicant has also employed metal shim stock material secured to the film and extending along the center of the fastener to hold the fastener in a mold having magnets.

U.S. Pat. No. 4,784,890 ('890 Patent) discloses a fastener which does not have an overlying plastic film covering the hooks, but relies on magnets to seal the fastener into the mold recess along the sides. The ends of the fastener are held in the mold recess by "restricting means", disclosed in the alternative as a length of polymeric film attached to and extending beyond the end of the fastener to be held in place by magnets in the mold, Col. 4, line 58-Col. 5, line 2; or "dam-like structures" which are placed on the ends of the fastener where the hooks have been removed by melting or cutting away the hooks to provide a flat area. Col. 5, lines 2–13. In '890 Patent the magnetic material for protecting the ends is attached as a short tab to the end of the fastener and extends beyond the end of the fastener.

The present invention provides an efficient and inexpensive fastener which can be used without a protective film, and which does not require attachment of hold-down members which extend beyond the ends of the fastener.

SUMMARY OF THE INVENTION

Therefore, it is an object of the invention to provide a fastener assembly which does not require a cover over the attachment members to prevent foam intrusion during molding.

It is another object of the invention to provide a fastener assembly which is simple to manufacture.

It is another object of the invention to provide a fastener assembly which is inexpensive to manufacture.

It is another object of the invention to provide a fastener assembly which does not require any form of extension beyond the length of width of the fastener assembly.

It is another object of the invention to provide a fastener assembly which does not require attachment to the base in the area of the attachment members of extraneous devices such as staples or other magnetically attractable objects.

These and other objects of the present invention are achieved in the preferred embodiments disclosed below by providing a fastener assembly of the type for being molded into cushions, comprising a base having first and second major surfaces defining first and second opposed ends and first and second opposed side edges. A multiplicity of attachment members are carried by the base and extend outwardly from the first major surface of the base for cooperating with complementary attachment members. First and second laterally extending sealing gaps are respectively positioned adjacent the first and second opposed ends of the base. The sealing gaps are defied by widthwise and lengthwise areas of the first major surface of the base being devoid of the attachment members for permitting a sealing dam carried by a mold in which the foamed article is molded to fit into the sealing gaps and sealingly engage the first major surface of the base to form a foam-tight seal between the opposed ends of the base and the sealing dam of the mold to prevent intrusion of liquid foam past the ends of the base onto the attachment members of the base during molding of the article. A multiplicity of permanent anchors is carried by the base and extend outwardly from the second major surface of the base. The anchors are spaced apart sufficiently to allow foam intrusion between the anchors to permanently attach the fastener assembly to a foamed article. First and second magnetically-attractable side edge sealing members are attached to the base adjacent respective ones of the first and second opposing side edges of the base for being attracted to magnets positioned in the mold in which the foamed article is molded to form a foam-tight seal between the side edges of the base and the mold to prevent intrusion of liquid foam past the side edges of the base onto the attachment members of the base during molding of the article.

According to one preferred embodiment of the invention, the fastener assembly comprises a base having first and second major surfaces defining first and second opposed ends and first and second opposed side edges. A multiplicity of attachment members are carried by the base and extend outwardly from the first major surface of the base for cooperating with complementary attachment members. First and second laterally-extending sealing gaps are respectively positioned adjacent the first and second opposed ends of the base. The sealing gaps are defined by widthwise and lengthwise areas of the first major surface of the base being devoid of the attachment members for permitting a sealing dam carried by a mold in which the foamed article is molded to fit into the sealing gaps and sealingly engage the first major surface of the base to form a foam-tight seal between the opposed ends of the base and the sealing dam of the mold to prevent intrusion of liquid foam past the ends of the base onto the attachment members of the base during molding of the article. A multiplicity of permanent anchors are carried by the base and extend outwardly from the second major surface of the base. The anchors are spaced apart sufficiently to allow foam intrusion between the anchors to permanently attach the fastener assembly to a foamed article. First and second side edge sealing means are attached to the base adjacent respective ones of the first and second opposing side edges of the base to form a foam-tight seal between the side edges of the base and the mold to prevent intrusion of liquid foam past the side edges of the base onto the attachment members of the base during molding of the article.

According to another preferred embodiment of the invention, the attachment members and the anchors are integrally molded of thermoplastic material, and the attachment members comprise a plurality of spaced apart rows of hook-like projections extending along at least a portion of the length and across at least a portion of the width of the base.

According to yet another preferred embodiment of the invention, the base is elongate and the first and second opposed side edges extend longitudinally from the first opposed end to the second opposed end.

According to yet another preferred embodiment of the invention, the sealing gaps are spaced from the ends of the base, and are separated from the ends of the base by at least some of the attachment members, which attachment members provide mechanical retardation of the flow of molding liquid from the ends of the base.

An embodiment of the method according to the invention comprises a method of fabricating a fastening assembly wherein the sealing gaps are formed by the steps of forming tie attachment members onto the base along substantially its entire length; and removing the attachment members at spaced-apart intervals along the length of die base so that the attachment members no longer extend outwardly to thereby define the sealing gaps.

According to one preferred embodiment according to the method of the invention, the step of removing the attachment members comprises the step of grinding, cutting or shaving the attachment members off of the first major surface of the base.

According to another preferred embodiment of the invention, the attachment members are melted by directing ultrasonic sound waves at the attachment members sufficient to flatten them.

According to yet another preferred embodiment of the invention, the step of melting the attachment members comprises pressing a heated platen against the attachment members sufficient to press them into the first major surface of the base.

The mold according to a preferred embodiment of the invention comprises a mold for preventing foam intrusion onto attachment members carried by a fastener assembly while molding the fastener assembly into a cushion. The mold comprises a mold body and a recess formed in the mold body for receiving the fastener assembly with the attachment members extending down into the recess. Side edge magnets are cared by the mold adjacent the recess for sealing with magnetically attractable seals carried by first and second side edges of the fastener assembly. First and second sealing dams are camed by the mold in the recess and intermediate the side edge magnets for fitting into the sealing gaps and sealingly engaging the first major surface of the base.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
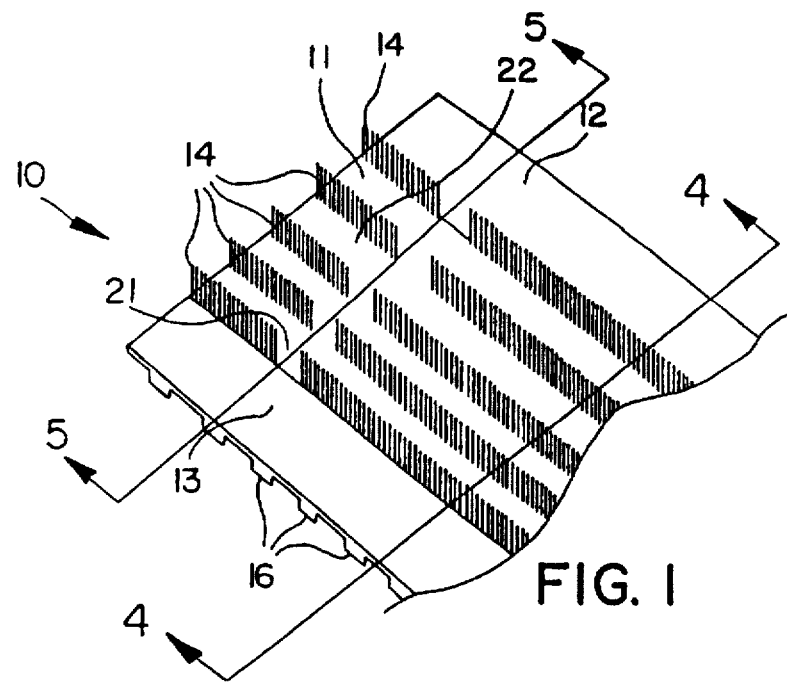
FIG. 1 is a perspective view of one end of a fastener assembly according to an embodiment of the invention, the other end being identical.
Figure 2:
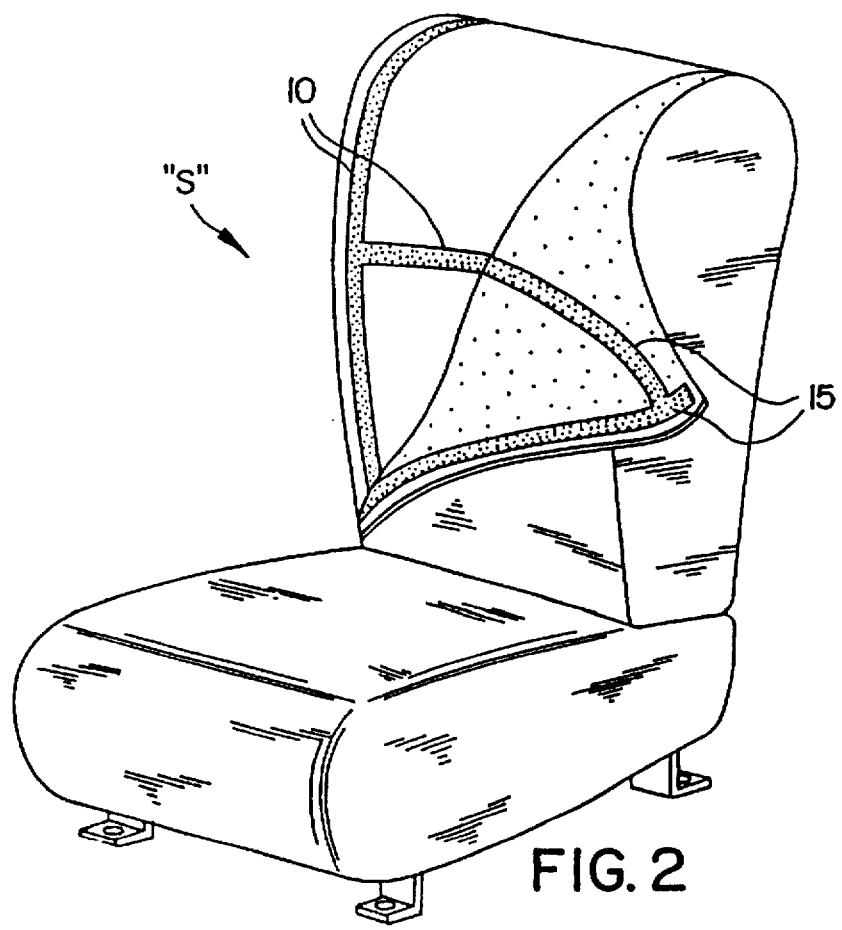
FIG. 2 is a perspective view of a foam seat cushion with a fastening member according to an embodiment of the invention molded into place to receive a complementary attachment members of a seat cover.

Referring now specifically to the drawings, a fastener assembly according to the present invention is illustrated in FIG. 1 and shown generally at reference numeral 10. As shown in FIG. 2, the fastener assembly according to the present invention is shown in the environment of a polyurethane foam molded vehicle seat "S". Fastener assembly 10 can be molded into the seat bottom or backrest in any desired pattern or arrangement to accommodate the design of the seat and of the seat cover to be held in place. The invention also has application in many other structures, such as headliners and in furniture. As is apparent from FIG. 2, the fastener assembly 10 may be quite long, and the length of the fastener assembly is not pertinent to the invention of this application. Only one end and a short adjacent length of the fastener assembly according to the invention is shown in FIG. 1.

Fastener assembly 10 includes a base 11 of a molded plastic material. The opposing side edges define flanges 12 and 13. The base 11 carries a large number of rows of attachment members in the form of relatively small, outwardly extending hooks 14. See also FIG. 4 for a more detailed view. These hooks 14 are intended to mate with patches 15 of complementary loose, fibrous, non-woven material attached to and carried by the seat cushion which is to be eventually placed over the foam cushions of the seat "S". See FIG. 2. The hooks 14 are ensnared in the fibrous material of the patches 15 and provide a secure attachment which can nevertheless be loosened when necessary.

Figure 4:
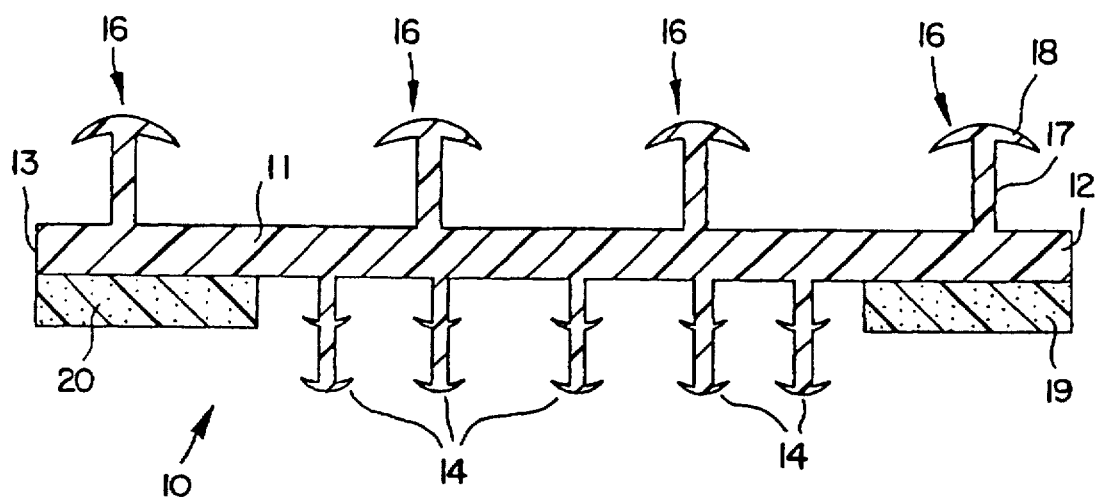
FIG. 4 is an enlarged and more detailed inverted vertical cross-section taken substantially along 4—4 of the fastener assembly shown in FIG. 1.

Several rows of anchoring elements such as anchors 16 are integrally molded into one side of the base 11. As is shown in FIG. 4, these anchors 16 have outwardly extending stems 17 carrying enlarged heads 18. The heads 18 made be of any suitable shape, but as shown are "anchor" shaped in lateral cross-section and provide enlarged surfaces which are molded into the foam and which provide substantial resistance against being dislodged once the molding process is completed and the foam and cured.

Figure 3:
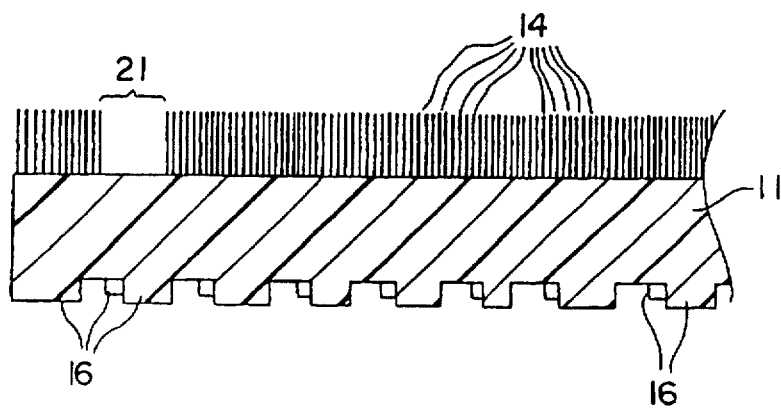
FIG. 3 is a vertical cross-section taken along the longitudinal axis showing the sealing gap of the fastener assembly shown in FIG. 1.

As is shown in FIG. 3, the anchors 16 are elongated along the length of the base 11 to provide greater gripping surface area for the foam.

Figure 5:
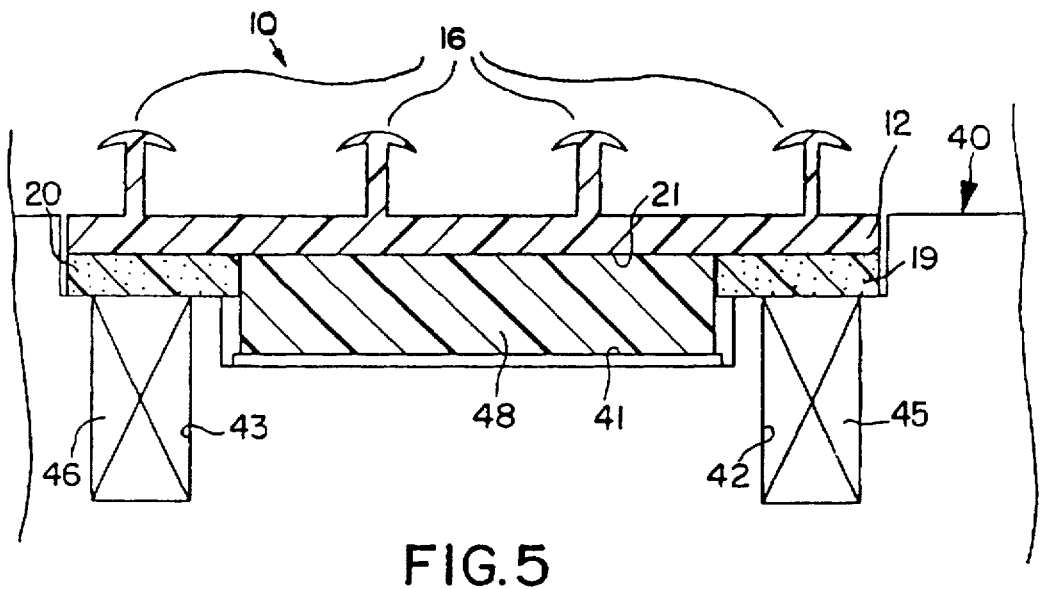
FIG. 5 is an enlarged and more detailed vertical cross-section taken substantially along 5—5 of the fastener assembly shown in FIG. 1, and shown inverted in molding position in a mold recess.
Figure 6:
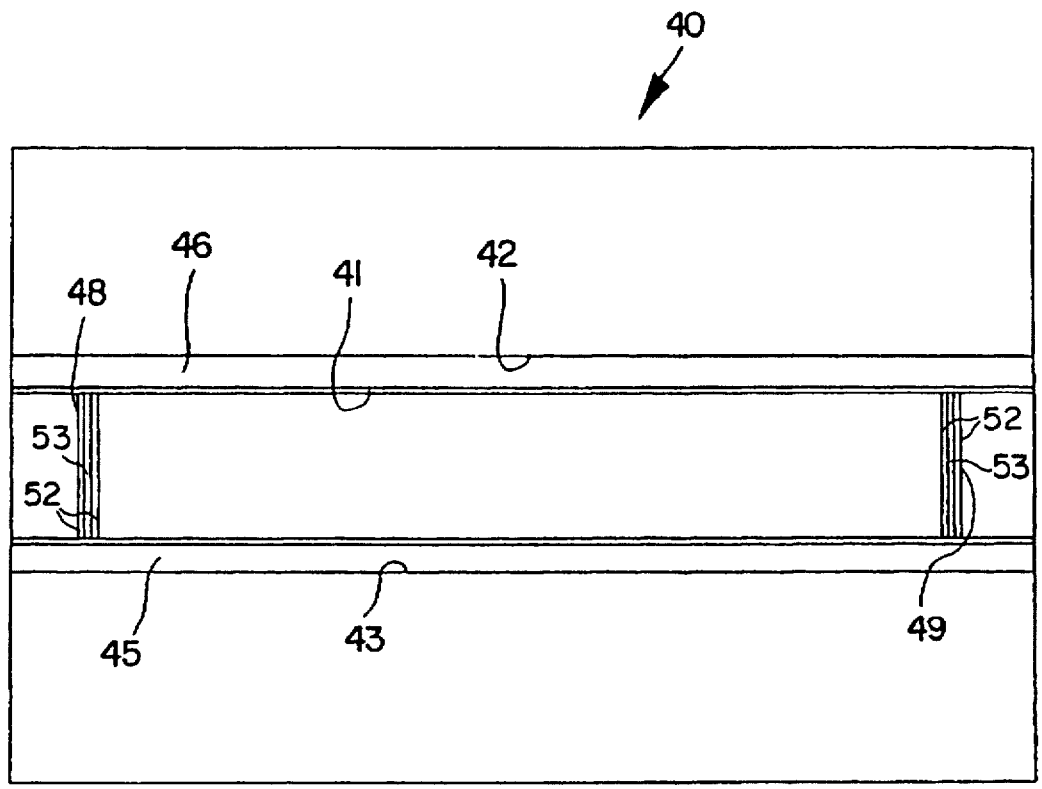
FIG. 6 is a top plan view of a mold insert according to the invention for receiving a fastener assembly according to an embodiment of the invention.

Referring now to FIG. 5, the anchors 16 project outwardly away from a mold insert 40 and are intended to be immersed in the molding liquid when the molding process begins. In the preferred embodiment of this application the base 11, the hooks 14 and the anchors 16 are integrally molded of any suitable thermoplastic material as known in the prior art. As is best shown in FIG. 4, a flexible plastic sheeting in strip form and containing a magnetically attractable powder such as strontium ferrite forms side seals 19 and 20. Side seals 19 and 20 are attached by a suitable adhesive to respective flanges 12 and 13 and extend along the side edges of the base 11 from one end to the other.

Referring again to FIGS. 1 and 3, an end sealing gap 21 is shown formed in the area of the hooks 14. The sealing gap 21 is preferably formed after the hooks 14 have been formed in the base 11 by grinding away the hooks 14 in a laterally-extending area from one side of the hook area to the other, as shown. Grinding is carried out by a grinding wheel which pulverizes the hook material and simultaneously smooths the area of the base 11 exposed when the hooks 14 are removed. Alternatively, the hooks 14 can be cut or shaved off, melted by ultrasonically heating the hooks 14 in the area where the sealing gap 21 is being formed, or pressing the hooks 14 into the surface of the base 11 with a heated platen. The term "removed" as used in the claims refers not only to actual physical removal of the hook material from the base, but also flattening or otherwise reducing the hooks to a level substantially below the level of the surrounding hooks 14.

Note that the gap 21 is formed slightly inwardly from the end of the fastener 10, leaving several ranks and files of hooks 14 between the sealing gap 21 and the end of the fastener 10. These several ranks and files of hooks 14 form a barrier which mechanically slows the flow of the foam inwardly from the ends of the fastener 10 towards the sealing gap 21. The closeness of the hooks 14 and the viscosity of the liquid foam cause the foam to progressively cling to and coat the hooks 14. The foam cures on the hooks 14 near the end of the fastener 10 causing a blockage of at least a substantial percentage of the foam Any remaining foam which seeps past the hooks 14 to the sealing gap 21 is trapped in the sealing gap, as described below.

It should be emphasized that both ends of the fastener assembly 10 are ordinarily like the end shown portion of the fastener assembly shown in FIGS. 1 and 3. Thus, both ends of the fastener 10 have the sealing gap 21 and the several ranks and files of hooks 14 between the sealing gap 21 and the end of the fastener 10.

As is shown in FIGS. 5, 6 7 and 9, the mold insert 40 comprises a steel block having a predetermined width and length of a size suitable to accommodate a fastener assembly 10 of a required length. Mold insert 40 fits into a recess in the surface of a cushion mold (not shown) and resides substantially flush with the cushion mold surface. Mold insert 40 includes a longitudinally extending fastener recess 41 into which the fastener assembly 10 is placed. Side magnet recesses 42 and 43 receive elongate side magnets 45 and 46 (see FIGS. 5 and 6). These side magnets 45 and 46 are positioned directly beneath the side seals 19 and 20 and magnetically attract the flanges 12 and 13 of the fastener assembly 10, thus sealing the longitudinal side edges of the fastener assembly 10 against the mold insert 40.

Figure 7:
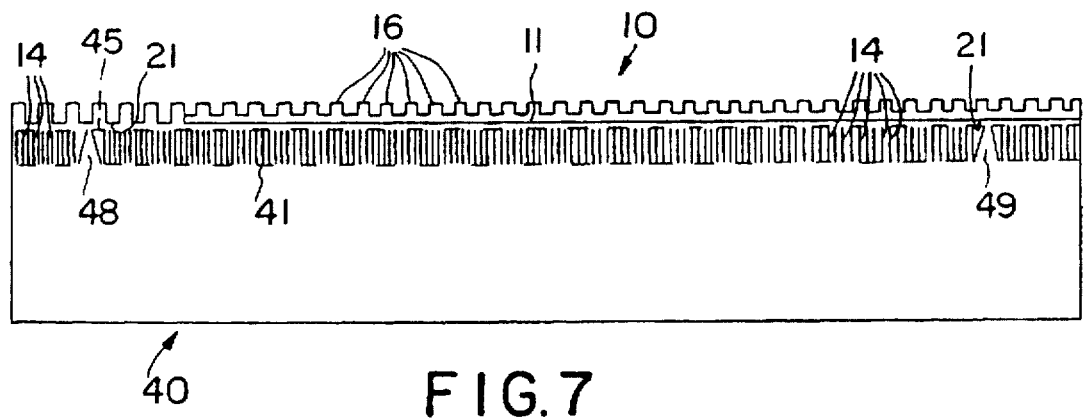
FIG. 7 is vertical cross-section of the mold insert shown in FIG. 6 taken through the center of the mold insert and showing a fastener assembly according to a preferred embodiment of the invention in place in the mold.

Two sealing dams 48 and 49 are positioned adjacent opposite ends of the mold insert 40 in the bottom wall of the fastener recess 41. Sealing dams 48 and 49 are positioned to extend laterally from one side of the fastener recess 41, and extend upwardly to fit in a sealing condition against the base 11 in the sealing gap 21, as is shown in FIGS. 5 and 7. Sealing dams 48 and 49 may be integrally formed with the mold insert 40, or fabricated as separate pieces and inserted into the mold insert 40 as shown.

Figure 8:
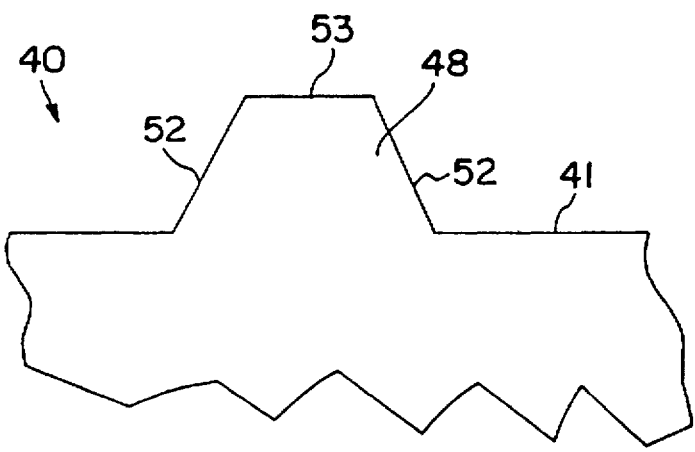
FIG. 8 is an enlarged vertical cross-sectional view of an embodiment of the sealing darn of the mold.
Figure 9:
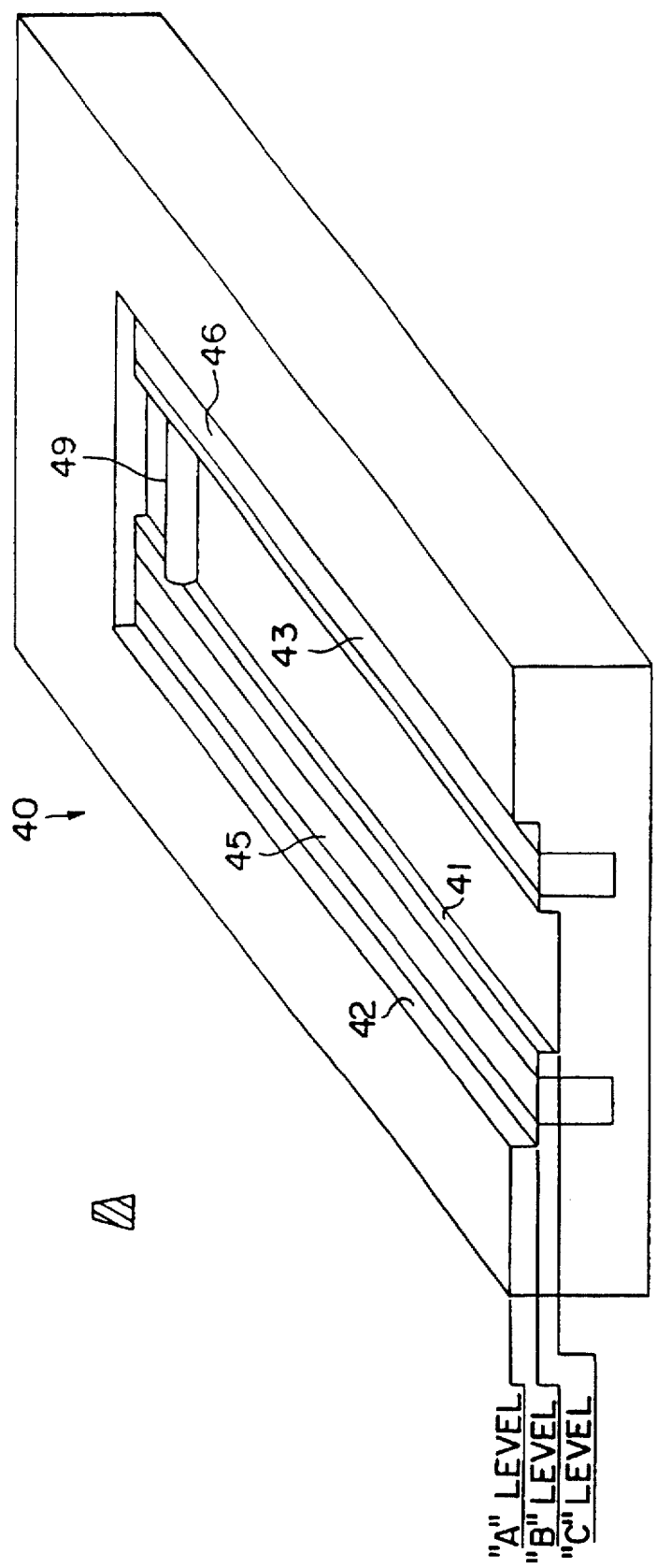
FIG. 9 is an isometric view with the facing end cut away for clarity showing the interior of the mold insert.

Sealing dams 48 and 49 are preferably tapered as shown in FIG. 8. Each sealing dam 48 or 49 includes tapered side walls 52 which terminate to form a truncated sealing surface 53 which directly engages the base 11 in the area of the sealing gap 21. Thus, any liquid foam seeping past the hooks 14 between the end of the fastener 10 and the sealing gap 21 encounter the physical barrier interposed by the sealing dams 48 and 49, thus preventing leakage onto the hooks 14 on the other side of the sealing gaps 21. As shown in FIGS. 5 and 7, the inverted position of the fastener 10 in the mold insert 40 will cause any liquid foam to flow onto the hooks 14 in the area of the downwardly-extending hook-like barbs near the free end of the hooks 14. The barbs further restrict and slow the flow of the liquid foam. Any foam seeping past the hooks 14 will first flow against the base of the sealing dams 48 and 49 before it can flow upwardly into the area where the sealing surface 53 and the base 11 are in sealing contact.

The number of hooks 14 left on the end of the fastener 10 between the end of the fastener 10 and the sealing gap 21 is in relation to the total number of hooks 14 on a fastener assembly 10, particularly on a long fastener assembly 10 such as is shown in FIG. 2.

In an exemplary embodiment of the invention, the base 11 is one inch wide and has 5 rows of hooks 14 equally spaced from each other. The flanges 12 and 13 are each ¼ inch wide. The fastener assembly 10 has 33 hooks 14 per row per linear inch, or, for example, 1650 hooks 14 (33×5×10") on a fastener assembly 10 ten inches long.

The sealing dams 48 and 49 may be 4 mm wide at their base tapering to 2 mm wide at the sealing surface 53. Other configurations of the sealing dams 48 and 49 can include spaced-apart ribs extending along their length to form multiple foam barriers, or deformable sealing members intended to conform to any irregularities in the surface of the base 11 at the point of contact with the sealing dams 48 or 49.

A fastener assembly and method of manufacturing a fastener assembly is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A method of fabricating a fastener assembly for being molded into a foamed cushion, comprising the steps of:

(a) forming a base having first and second major surfaces defining first and second opposed ends and first and second opposed side edges;

(b) providing a multiplicity of attachment members on the base, the attachment members extending outwardly from the first major surface of the base and along substantially the entire length of the base;

(c) removing a number of said attachment members from the base a spaced-apart distance inwardly from respective first and second opposed ends to form first and second laterally-extending end sealing gaps extending laterally from the first side edge of the base to the second side edge of the base, each of said sealing gaps being defined by a widthwise and lengthwise area between the attachment members of the first major surface of the base and being devoid of said attachment members for permitting a sealing dam carried by a mold in which the foamed cushion is molded to fit into said sealing gap and sealingly engage the first major surface of said base to form a foam-tight seal between the end of the base and the sealing dam of the mold to prevent intrusion of liquid foam past the end of the base onto those attachment members located between the sealing gaps during molding of the cushion; and (d) attaching first and second magnetically-attractable side edge sealing members to said base adjacent respective ones of said first and second opposing side edges of said base for being attracted to magnets positioned in the mold to form a foam-tight seal between the side edges of the base and the mold to prevent intrusion of liquid foam past the side edges of the base onto the attachment members of the base during molding of the cushion.

2. A method according to claim 1, wherein the step of removing the attachment members comprises grinding the attachment members off of the first major surface of the base.

3. A method according to claim 1, wherein the step of removing the attachment members comprises melting the attachment members by directing ultrasonic sound waves at said attachment members sufficient to melt them into the base.

4. A method according to claim 3, wherein the step of melting the attachment members comprises pressing a heated platen against the attachment members sufficient to press them into the first major surface of the base.

5. A method according to claim 1, and comprising the step of providing a multiplicity of permanent anchors on the base and extending outwardly from the second major surface of the base, the anchors being spaced apart sufficiently to allow foam intrusion between said anchors to permanently attach said fastener assembly to the foamed cushion.

* * * * *